United States Patent [19]

Sano et al.

[11] Patent Number: 4,528,073
[45] Date of Patent: Jul. 9, 1985

[54] METHOD FOR MANUFACTURING MULTICOLORED PLATE, MULTICOLORED FILTER AND MULTICOLORED DISPLAY DEVICE

[75] Inventors: Yutaka Sano; Koji Iwasa; Hitoshi Kamamori; Mitsuru Suginoya; Yumiko Terada, all of Tokyo, Japan

[73] Assignee: Seiko Instruments & Electronics Ltd., Tokyo, Japan

[21] Appl. No.: 563,946

[22] Filed: Dec. 21, 1983

[30] Foreign Application Priority Data

Dec. 22, 1982 [JP] Japan ............................... 57-233931
Dec. 22, 1982 [JP] Japan ............................... 57-233932

[51] Int. Cl.³ .............................................. C25D 11/24
[52] U.S. Cl. ..................................... 204/15; 204/18.1; 204/37.6; 204/58; 204/38.3; 204/38.4
[58] Field of Search ............ 204/15, 18 R, 35 N, 204/58, 38.3, 38.4

[56] References Cited

U.S. PATENT DOCUMENTS

| | | | |
|---|---|---|---|
| 2,424,621 | 7/1947 | McClatehey | 204/18.1 |
| 3,284,321 | 11/1966 | Fromson | 204/15 |
| 3,450,606 | 6/1969 | Darrow | 204/18.1 |
| 3,532,607 | 10/1970 | Roberts | 204/18.1 |
| 3,619,385 | 11/1971 | Rjumshina et al. | 204/15 |
| 3,775,263 | 11/1973 | Rjumshina et al. | 204/15 |
| 3,839,163 | 10/1974 | Kaneda et al. | 204/18.1 |

FOREIGN PATENT DOCUMENTS 51-107318  9/1976  Japan.

*Primary Examiner*—R. L. Andrews
*Attorney, Agent, or Firm*—Robert E. Burns; Emmanuel J. Lobato; Bruce L. Adams

[57] ABSTRACT

A multicolor display device and its method of manufacture which comprises providing first and second spaced and opposed substrates, forming a pattern of separate groups of display electrodes on the surface of the first substrate which faces the second substrate, depositing and electrolytically oxidizing an aluminum film on each display electrode, dying the oxidized films on each separate group of display electrodes a color tone which is different from the color tones of the other display electrode groups, forming a counter electrode pattern on the surface of the second substrate, and disposing a display material in the space between the spaced apart first and second substrates.

14 Claims, 7 Drawing Figures

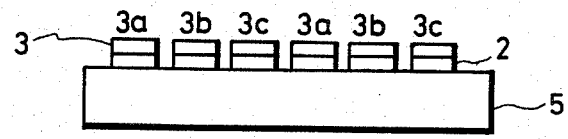
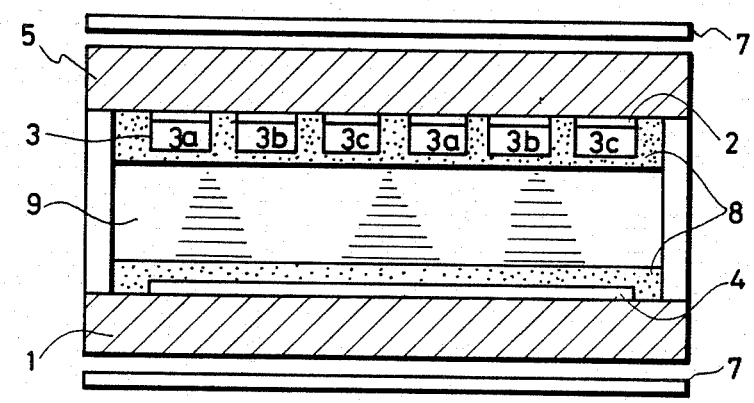
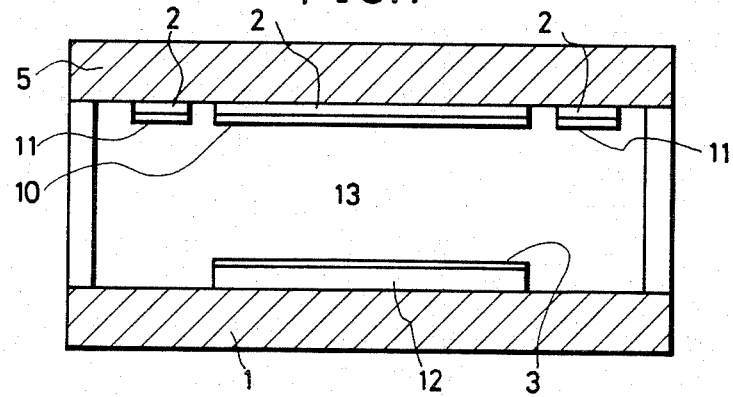

METHOD FOR MANUFACTURING MULTICOLORED PLATE, MULTICOLORED FILTER AND MULTICOLORED DISPLAY DEVICE

BACKGROUND OF THE INVENTION

The present invention relates to a method for manufacturing multicolored plates such that the surface of a substrate is divided by different colors. The present invention especially relates to a method for manufacturing multicolored plates having fine and close pattern.

The present invention also relates to a method for manufacturing a multicolor display device using a color filter.

One coventional method for manufacturing multicolored plates includes a coloring method utilizing surface diffusion of metal ion known as the so-called staining method, another coloring method comprises the printing and burning of low melting temperature glass frit and another coloring method utilizes printing ink containing organic polymer binder.

However, these conventional methods have various drawbacks. For instance the coloring method by printing has the drawback that the color layer is quite uneven and lacks in clarity and therefore is not a good color layer. The staining method also has the drawback that the fabrication process is complicated by using strong heat and that the possible color tone is restricted though the surface of the substrate keeps its initial smoothness. In addition, these methods have the common drawback in making a fine multicolor pattern that they lack accuracy and at most achieves only some hundreds μm of accuracy and that colors of different tones are mixed with each other at the boundary where the two different colors are divided in two portions.

Also known is a method for manufacturing multicolored plates by coloring anodically oxidized aluminum film which has the good points of smoothness of the colored layer, wide variaty of possible color tone and easy fabrication. This method is applied for various purposes. This method comprises the steps of forming a thin film of aluminum on a base plate, changing this thin film of aluminum into a thin film of anodically oxidized aluminum by an anodically oxidizing method, coloring this thin film of anodically oxidized aluminum by organic or inorganic coloring materials and thereafter sealing the porosity on the surface of the anodically oxidized aluminum thin film so as to stabilize the colored layer. Thus the multicolored plate is quite easily obtained by the above introduced fabrication process.

However this method has to employ the photo-resist method or the sublimate transferring method utilizing thermal sublimation of a sublimate dye so as to divide the anodically oxidized aluminum thin film into different colors. The former method has the drawback that repetition of the photolithography process is required for the different number of color tones and that the fabrication process is complicated. The latter method has also the drawback that the possible color tone is limited due to a limited variety of the sublimate dyes and that a quite fine pattern is hard to obtain according to this method.

FIG. 1 shows an example of a conventional multicolor display device using a color filter. Numeral 1 is a transparent substrate, 2 is a transparent electrode on which a desired figure or letter is patterned, 3 is a color filter, 4 is a second transparent electrode, and 5 is a counter substrate. In a display cell of the above construction, a display material which acts as an optical shutter, such as liquid crystal, electrochromic material or the like, is sandwiched and held between the transparent substrate 1 and the counter substrate 5. Viewing from the direction of the transparent substrate 1, when the shutter "opens", the color of the color filter 3 is displayed; while, when the shutter "closes", the color of the color filter 3 is masked and not shown. Accordingly, when the three primary colors are selected for the color filter, such as, for example, 3a(red), 3b(Green), and 3c(blue) in FIG. 1, and the three primary colors are periodically patterned in a repeating manner, a multicolor display can be made on a single cell. More specifically, to display red, only the optical shutter on the red pattern 3a "opens" and the optical shutters on 3b and 3c "close". To display yellow, the optical shutter on the red pattern 3a and the green pattern 3b "open", and the optical shutter on the blue pattern 3c "closes". In the latter case, yellow is displayed by additive color mixture. If the color filter 3 has an appropriate light transparency and the counter substrate 5 is transparent, a similar effect is obtained if a luminous display material is sandwiched and held between the transparent substrate 1 and the counter substrate 5 and viewed from the direction of the counter substrate 5.

As illustrated, a multicolor display using a color filter is a simple method, and is used for various purposes and has a great effect. Actually, however, in manufacturing a multicolor display device with a color filter, it is difficult to coincide the pattern of the transparent electrode with the pattern of the color filter. The more fine and multicolored the patterns, the more difficult it becomes to coincide the patterns. The color filter can be formed by means of screen printing, photolithography or the like. In the case of screen printing, however, a pattern can not be so finely made. Namely, the more the pattern is multicolored, the worse the precision of the printing portion is, and color shear occurs. In the case of photolithography, a pattern can be made fine, but the processes are extremely complicated since the photolithography process is needed whenever the color changes. This is inconsistent with the advantages of the color filter; that is, the simplicity and capability of multicolor display.

SUMMARY OF THE INVENTION

The present invention aims to resolve the above mentioned drawbacks of the conventional method. It is an object of the present invention to provide a method for manufacturing multicolored plates having high pattern accuracy and which are easily fabricated, the method utilizing the anodically oxidizing method of aluminum without loss of the good points thereof and not being limited by the fineness of the pattern and the number of the color tones.

This invention also aims to eliminate the above-noted drawbacks in manufacturing a color filter and provides a multicolor display device with fine patterns at low cost.

BRIEF EXPLANATION OF THE DRAWINGS

FIG. 4 and FIG. 5 show a multicolored filter formed on a transparent glass substrate in the shape of stripe.

FIG. 6 shows a TN-type liquid crystal display capable of a multicolor display for illustrating a manufacturing method of the present invention.

FIG. 7 shows an electrochromic display device capable of a multicolor bar graph display for illustrating another embodiment of a manufacturing method of the present invention.

DETAILED DESCRIPTION OF THE INVENTION

A general outline of the process for making multicolored plates according to the present invention is described hereinbelow.

Figure 1:
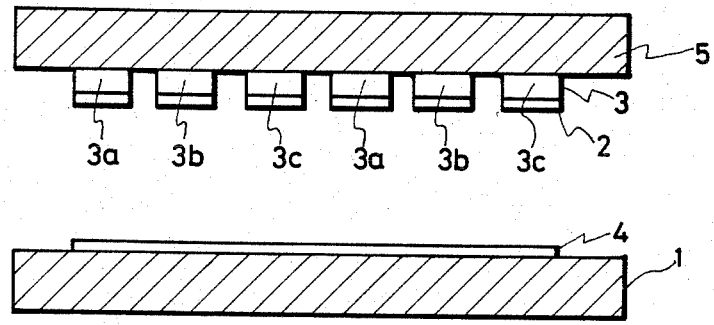
FIG. 1 shows a conventional multicolor display device using a color filter.

First aluminum film is formed all over the surface of the base plate by spattering or vacuum evaporation. This aluminum film is dry-etched or chemically etched in desired plural patterns as shown in FIG. 1. Next a part of the thus formed plural patterns is selected for connection to a power source terminal so as to anodically oxidize the aluminum film.

Therefore the selected part of the aluminum film pattern is changed to an oxidized aluminum film. This oxidized aluminum film has quite large transparency for visible rays and can be colored by various methods. Therefore it is possible to color only the oxidized aluminum film which is selectively oxidized while the remaining aluminum film other than the selectively oxidized portion is left uncolored. Thus a method for easily manufacturing multicolored film is obtained by repeating the selective oxidation process and coloring process. This method does not require any complicated process such as is needed in the conventional photo-resist method. This method also does not have any drawback which exists in the conventional sublimate dye method including the drawback that a very fine pattern is hardly obtained. According to this method the multicolored plate having high accuracy is easily obtained without regard to the tone of the colored layer and the fineness of the pattern.

Now a general outline of the process for making multicolored filters according to the present invention will be described hereinbelow.

This invention adopted the anodic oxidation technique of Al. An Al film is coated on an overall surface of a transparent electrode ($SnO_2$, ITO or the like) by sputtering, vacuum evaporation or the like. The Al film and the transparent electrode are dryly etched or chemically etched in a desired pattern, e.g., in a stripe pattern, so that the stripe of the transparent electrode and the stripe of an Al film completely overlap each other. The patterned transparent electrode and the Al film are selected as desired and connected to the electrode to be oxidized anodically in an anodic oxidation bath. Then, only the Al film connected to the electrode is changed to aluminium oxide film. The aluminium oxide has extremely high transparency for light in the visible spectrum and can be colored by various methods. Therefore, only the aluminium oxide film made by selective anodic oxidation of the Al film is colored and the portions which are not anodically oxidized are left uncolored. Thus, by repeating the processes of selective anodic oxidation and coloration of the Al film on the transparent electrode, a multicolor filter with fine patterns, and without color shear as occurs in screen printing and without a complicated process of manufacture as in photolithography, is easily formed at low cost.

The present invention will be described in detail in conjunction with preferred embodiments.

Embodiment 1. Method for manufacturing the multicolored plate

The first process: Forming aluminum film

Figure 3:
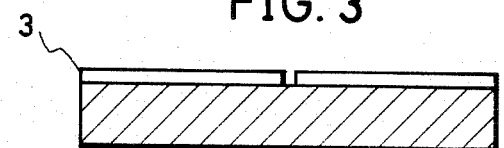

As shown in FIG. 3 an aluminum film 3 is formed by sputterring in 2 $\mu$m thickness the entire surface of over the base plate 5. Alternatively the aluminum film may be formed by vacuum evaporation.

The second process: Etching of pattern

Figure 2:
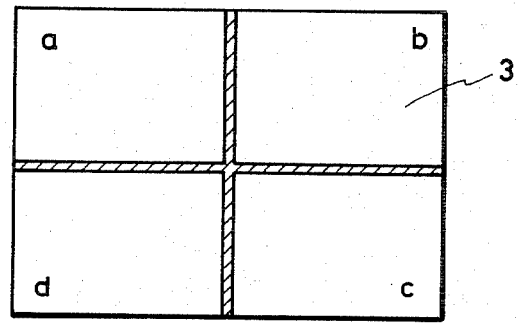
FIG. 2 and FIG. 3 show patterned aluminum film on a substrate.

As shown in FIGS. 2 and 3, the aluminum film formed by the first process on the entire surface of the base plate 5 is dry-etched or chemically etched so as to divide the aluminum film in four parts a, b, c and d. In this case the four parts a, b, c and d of the aluminum film have to be absolutely electrically isolated with each other.

The third process: Anodic oxidation

With respect to the structure shown in FIG. 2, it is assumed that the four parts of the aluminum film a, b, c, and d are divided by color such as red, green, blue and yellow respectively. The color which firstly covers the aluminum film is assumed to be red. The a part of the aluminum film is thus selected to be connected with the electrode of the power source. The aluminum film of the a part is immersed in sulfuric acid aqueous solution containing 15 weight % of sulfuric acid together with a platinum plate having a larger surface area than the aluminum film, the platinum plate being a cathode electrode. The a part of the aluminum plate is anodically oxidized by applying the constant voltage ranging from +4.0 volts to +5.0 volts under room temperature conditions. The surface of the a part aluminum film is thus changed to an oxidized aluminum film having a thickness of 1 $\mu$m. It takes about 40 minutes to obtain the oxidized aluminum film of 1 $\mu$m thickness. Alternatively an anhydrous chromic acid bath, oxalic acid bath or phosphoric acid bath can be used instead of the sulfuric acid bath.

The fourth process: Coloring

Next the base plate 5, the a part aluminum film of which is selectively oxidized, is immersed for several minutes in an acid bath containing red acid dye Alizarine Rubinol 3G. The oxidized aluminum layer formed on the a part of the base plate is dyed red in color because the dye molecules are absorbed on the porous surface of the oxidized aluminum. At the same time the surface of the b, c and d parts is not dyed red during the fourth process because the surface of the b, c and d parts is aluminum metal which has not been changed to oxidized aluminum.

The fifth process: Porosity-sealing treatment

The anodically oxidized film of the a part which has been dyed red in color is subjected to a porosity-sealing treatment.

The porosity existing on the surface of the oxidized aluminum film is sealed by subjecting the base plate to steam. Oxidized aluminum chemically absorbs the water molecules of steam to produce bulky hydrate of the oxidized aluminum, which effectively seals the porosity. Thus the anodically oxidized film after the porosity-sealing treatment is hardly bleached and is not duplicately dyed in a different color during the following processes in which the remaining aluminum film portions b, c and d are anodically oxidized and are successively dyed in different colors. In addition the resistance against reagents, heat and light is improved by sealing the porosity of the oxidized aluminum. Alternatively other porosity-sealing treatments using nickel acetate or boiled water can be effectively used.

The sixth process: Coloring the b part green

Next the aluminum film of the b part is selectively anodically oxidized so as to convert the surface of the aluminum film to an oxidized aluminum layer and is dyed green in color by immersing the same in acid bath containing the green acid dye Aluminum Green GLW by repeating the afore described third, fourth and fifth process steps. Thereafter the oxidized and colored aluminum layer is subjected to the porosity-sealing treatment.

The seventh process: Coloring the c part blue

In the same manner as the sixth process, the aluminum film of the c part is selectively anodically oxidized to become an oxidized aluminum film. The oxidized aluminum film is then immersed in acid bath containing blue acid dye. Aluminum Blue LLW to dye the surface of the oxidized aluminum film blue in color. Then the colored film is subjected to the porosity-sealing treatment.

The eighth process: Coloring the d part yellow

In the same manner as the seventh process, the aluminum film of the d part is selectively anodically oxidized to become an oxidized aluminum film. The oxidized aluminum film is then immersed in acid bath containing yellow acid dye Quinoline Yellows to dye the surface of the oxidized aluminum film yellow in color. Then the colored film is subjected to the porosity-sealing treatment.

Thus the multicolored plate divided by the different colors red, green, blue and yellow is completed as shown in FIG. 2. The dye which is to be used in the fourth, sixth, seventh and eighth process steps is not limited to those described above but may be selected from various acid dyes (See the Dye Manual published by Maruzen). Inorganic dyes are also available. Further the oil-soluble dyes Sumiplast Turquaise Blue B or Sumiplast Red FB in chloroform solution are also effective to obtain a good colored film.

Embodiment 2. Method for manufacturing multicolored filter

The first process: Forming transparent electrode

Figure 4:
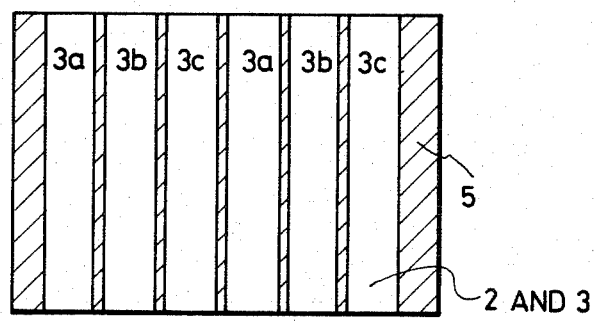

As shown in FIGS. 4 and 5, a transparent electrode film 2 made of tin dioxide or indium tin oxide is formed on the entire surface of the transparent glass substrate 5.

The second process: Forming aluminum film

An aluminum film 3 is formed on the transparent electrode film 2 in a thickness of 1 to 2 $\mu$m by spattering. The aluminum film covers the entire surface of the transparent electrode film 2.

The third process: Etching pattern

As shown in FIGS. 4 and 5 the aluminum film and the transparent electrode film are altogether identically etched by dry-etching or chemical etching to form a stripe pattern. The width of a single stripe is 50 $\mu$m. The distance between adjacent two stripes is 20 $\mu$m.

The fourth process: Anodic oxidation

It is assumed that the stripes 3a are colored red, the stripes 3b are colored green and the stripes 3c are colored blue and that the firstly colored stripes are assumed to be the stripes 3a. Only the stripes 3a are selected so that the transparent electrode and the aluminum film of the stripes 3a are connected to the electrode of a power source. The substrate is immersed into 15 weight % sulfuric acid aqueous solution bath together with the platinum plate having a larger surface area than the stripe surface of the aluminum film and the platinum plate serves as the cathode. The aluminum stripe film is anodically oxidized by applying constant voltage ranging between +4.0 volts and +5.0 volts at room temperature. All of the aluminum film on the transparent electrode is changed to the transparent oxidized aluminum film. It takes about 30 minutes or 60 minutes depending on the thickness of the aluminum film to finish the anodic oxidation and to change the aluminum film to the transparent oxidized aluminum film. Thus the stripes 3a alone turn to transparent while the other stripes 3b and 3c are left as opaque aluminum film.

The fifth process: Coloring

Next the transparent glass substrate containing the selectively oxidized aluminum film stripes 3a is immersed in acid bath containing red acid dye Alizarine Rubinal 3G for several minutes so that the transparent oxidized aluminum film formed on the surface of the stripes 3a is colored red.

The sixth process: Porosity-sealing treatment

The porosity on the oxidized aluminum film which is colored red is sealed by subjecting the same to a steam treatment.

The seventh process: Coloring the stripe 3b green

By repeating the same processes as the fourth, fifth and sixth process steps, the aluminum film of the stripes 3b is selectively anodically oxidized to be changed to the transparent oxidized aluminum film, which is immersed in acid bath containing the green dye Aluminum Green GLW and therefore is colored green. After this the substrate is subjected to the porosity-sealing treatment.

The eighth process: Coloring the stripe 3c blue

By repeating the same processes as the fourth, fifth and sixth process steps, in the aluminum film of the stripe 3c is selectively anodically oxidized to be changed to the transparent oxidized aluminum film, which is immersed in acid bath containing the blue acid dye Aluminum Blue LLW and therefore is colored blue. After this the substrate is subjected to the porosity-sealing treatment. Thus the color filter having red, green and blue stripes is completed.

When the pattern of the multicolored plate or the multicolored filter such as those described in the above explained two embodiments, is coarse, the patterning process of the aluminum film or the double layer film of aluminum and the transparent conductive film may be replaced by another process as described below instead of the first and the second process in the embodiment (1) or the first, the second and the third process in the embodiment (2). Namely, a metal mask having the same pattern as that formed on the surface of the substrate is closely set on the surface of the substrate. Then the substrate covered by the metal mask is subjected to a spattering process of aluminum or of indium tin oxide and aluminum so that the aluminum film or the double layer film of indium tin oxide and aluminum having the desired pattern is obtained without effecting the etching process.

As above explained, according to the present invention, the following two merits are attained.

(1) As mentioned in the embodiment (1), without losing the smoothness of the colored layer and wide variety of the color tone, the multicolored plate having a very accurate pattern is easily manufactured without regard to the fineness of the pattern and the number of color tones.

(2) As mentioned in the embodiment (2), the oxidized aluminum film formed on the transparent electrode by anodically oxidizing the metal aluminum film does not have the drawback of low transparency of the oxidized aluminum film which exists in the oxidized aluminum film obtained by directly oxidizing the metal aluminum film directly provided on the glass substrate without sandwiching the transparent conductive film therebetween. The oxidized aluminum film formed on the transparent electrode has quite high transparency for visible rays. Thus without losing the merit which the oxidized aluminum film has, a very accurate multicolored filter is easily manufactured without regard to the fineness of the pattern and the number of color tones.

Next a method for manufacturing a multicolored display device utilizing the multicolored filter will be illustrated in accordance with embodiments.

Embodiment 3: Method for manufacturing a multicolor display device using a liquid crystal The first process: Forming Al film An Al film 3 is 1-2 $\mu$m thick is formed on the overall surface of a transparent electrode 2 ($SnO_2$, ITO or the like) on the transparent glass substrate 5 (refer to FIG. 6) by spattering. The Al film may also be formed by vacuum evaporation.

The second process: Pattern etching

As shown in FIG. 4, the Al film and the transparent electrode are dry etched or chemically etched in a stripe pattern having stripes 50 $\mu$m wide and separated by a 20 $\mu$m space.

The third process: Anodic oxidation

As shown in FIG. 6, the stripes 3a, 3b and 3c are respectively colored red, green and blue. If the color initially colored is red, for example, only the stripes 3a are selected, and the transparent electrode and the Al film are connected to the electrode of a power source. Then the anodic oxidation is made in 15 weight % sulfuric acid solution using a Pt plate as cathode having an area equivalent to or more than that of the anode Al film at room temperature at constant voltage of +4.0 to +5.0, whereby the Al film on the transparent electrode becomes a transparent aluminum film. The time taken to complete the anode oxidation and change the Al film on the transparent electrode to a transparent oxide aluminum film is about 30-60 min. though varies according to the Al film thickness. Thus, only the stripes 3a are transparent, and the stripes 3b and 3c are left as opaque Al film. Besides the sulfuric bath, chromic acid anhydride bath, oxalic acid bath, phosphoric acid bath or the like can be used as the anodic oxidation bath.

The fourth process: Coloration

The transparent glass substrate containing the Al film of the stripes 3a which are selectively anodically oxidized is immersed in an acid bath of red acid dye: Alizarine Rubinol 3G for several minutes. As a result, the transparent aluminum oxide film formed on the surface of the stripes 3a is colored red. Since the Al film on the stripes 3b and 3c are not oxidized and completely left at this time, the stripes 3b and 3c are not colored in this process.

The fifth process: Porosity-sealing treatment

Porosities of the anodic oxidation film of the red stripes 3a are sealed in steam. The anodic oxidation film after coloration and porosity-sealing treatment is hardly bleached and never dyed again by other colors even after the Al film of the stripes 3b and 3c are anodically oxidized and then colored in the following processes. Further, the porosity-sealing treatment improves the chemical resistance, heat resistance, and light resistance of the filter, and the reliability in manufacturing the display device is also enhanced. Besides the porosity-sealing treatment in steam, satisfactory results can be obtained by porosity-sealing in sodium nickel acetate and porosity-sealing in boiling water.

The sixth process: Coloring the stripe 3b green

The operations the same as the third, fourth and fifth processes are repeated and only the Al film of the stripes 3b is selectively anodically oxidized to form a transparent aluminium oxide film. The transparent aluminium oxide film is immersed in acid bath of green acid dye: Aluminium Green GLW, colored green, and then the porosity-sealing treatment is made.

The seventh process: Coloring the stripe 3c blue

The operations the same as the third, fourth and fifth processes are repeated and only the Al film of the stripes 3c is selectively anodically oxidized to form a transparent aluminium oxide film. The transparent aluminium oxide film is immersed in acid bath of blue acid dye: aluminium Blue LLW, colored blue and then the porosities are sealed. In this manner stripe color filters of red, green and blue are formed. For coloration of the stripes in in fourth, sixth and seventh process steps, various acid dyes (refer to "Dye manual", published by Maruzen) can be used besides the above acid dyes, and inorganic dyes can also be used. An excellent coloration can also be made by using chloroform solution of solvent dye: Sumiplast Turquoise Blue B, Sumiplast Red FB.

The eighth process: Forming alignment film

An alignment film 8 of liquid crystal 9 is formed by oblique evaporation of, for example, SiO on the stripe color filter of red, green and blue formed through the above processes and the second electrode 4.

The ninth process: Assemblying liquid crystal cell

A TN-type liquid crystal display device which can easily display multicolor or full color is completed as shown in FIG. 6 by holding a nematic liquid crystal 9 between the color filter and the second transparent electrode 4 on which the alignment film 8 is formed. The liquid crystal display device is characterized in that the transparent electrode 2 used for anodically oxidizing the Al film of the stripes 3a, 3b and 3c respectively is used for a driving electrode for the liquid crystal display device as it is. Alternatively, on the stripes 3a, 3b and 3c of the completed color filter can be respectively overlaid transparent electrodes to act as driving electrodes. Besides the TN-type display, a dichroism color pigment dissolved in liquid crystal for G-H type display or DSM of a nematic liquid crystal may be used.

Embodiment 4: Method for manufacturing a multicolor display device using electrochromic material An Al film is formed on the overall surface of a transparent electrode on a white ceramic substrate 12 (refer to FIG. 7) by spattering. After that a, trichromatic stripe color filter 3 of red, green and yellow is formed by the same method as the embodiment 3. In coloring a transparent aluminium oxide film formed by anodic oxidation yellow, an acid bath of yellow acid dye: Quinoline Yellow S, is used. For coloration of red and green, the acid bath of the same acid dye as the embodiment 3 is used. A propylene carbonate solution of a lithium perchlorate (1M) is held as an electrolyte 13 between the counter substrate 1, on which the color filter 3 is formed, and a transparent glass substrate 5 with a $WO_3$ display electrode 10 having the same stripe pattern as the color filter 3 on the display electrode 2 and a $WO_3$ counter electrode 11. By such a construction an electrochromic display device capable of multicolor bar graph display as shown in FIG. 4 is completed.

As described in the embodiments 3 and 4, according to the manufacturing methods of the present invention, a multicolor filter having fine patterns without color shear can be manufactured extremely simply at low cost without requiring complicated processes. Further, a selective coloration of an anodic oxidation film is securely carried out by porosity-sealing treatment.

What we claim is:

1. A method for manufacturing a multicolored display device comprising the steps of: forming on a surface of a first substrate a plurality of display electrodes in a stripe pattern; forming a plurality of aluminium films on respective ones of said plural display electrodes; connecting a first group of said plural display electrodes to an anode; electrolytically oxidizing the aluminum films on the first group of display electrodes which are connected to the anode to change the same to oxidized aluminum films; dyeing the oxidized aluminum films in one of the three primary colors to obtain a first group of oxidized aluminum films dyed in the one primary color; sealing the porosity on the surface of the colored and oxidized aluminum films; repeating the connecting, oxidizing, dyeing and sealing steps for a second and a third group of said plural display electrodes to obtain second and third groupss of oxidized aluminum films dyed in the other two primary colors; forming a counter electrode on a second substrate; disposing the first and second substrates in spaced apart relationship with the display electrodes facing the counter electrode; and confining display material between the spaced apart first and second substrates.

2. A multicolor display device comprising: a first substrate; a plurality of display electrodes disposed on a surface of said substrate; an oxidized aluminum film disposed on each said display electrode, said oxidized aluminum films being respectively differently colored by different dyes; a second substrate spaced apart from the first substrate; a counter electrode disposed on said second substrate in opposed facing relation with respect to said display electrodes; and display material disposed between said display electrodes and said counter electrode whereby said display material selectively passes incident light by applying voltage between selected display electrodes and the counter electrode so as to display the colored aluminum film corresponding to the selected display electrodes.

3. A method of manufacturing a multicolor display device comprising the steps of: providing first and second substrates; forming a pattern of separate groups of display electrodes on a surface portion of the first substrate; forming aluminum films on the display electrodes; electrolytically oxidizing the aluminum films on the display electrodes of one group to convert the same to oxidized aluminum films; dyeing the oxidized aluminum films with a dye of one color tone to obtain one group of display electrodes having oxidized aluminum films dyed in one color tone; successively repeating the electrolytically oxidizing and dyeing steps using other groups of display electrodes and dyes of different color tones to obtain other groups of display electrodes having oxidized aluminum films dyed in different color tones such that each separate display electrode group has a dyed color tone different from the others; forming a counter electrode pattern on a surface portion of the second substrate; disposing the first and second substrates in opposed spaced-apart relation with the pattern of display electrode groups oppositely facing the counter electrode pattern; and confining a display material in the space between the spaced-apart first and second substrates.

4. A method according to claim 3; including the step of sealing the porosity on the surface of the dyed and oxidized aluminum films of each display electrode group before the next successive electrolytically oxidizing and dyeing steps are carried out.

5. A method according to claim 4; wherein the pattern of separate groups of display electrodes comprises three separate display electrode groups each having oxidized aluminum films dyed in a different one of the three primary colors.

6. A method according to claim 5; wherein the pattern of three separate display electrode groups comprises a plurality of stripes arranged in repeating sets with each set comprised of one display electrode from each of the three separate display electrode groups.

7. A method according to claim 6; wherein the stripes have a width on the order of 50 $\mu$m.

8. A method according to claim 3; wherein the pattern of separate groups of display electrodes comprises three separate display electrode groups each having oxidized aluminum films dyed in a different one of the three primary colors.

9. A method according to claim 8; wherein the pattern of three separate display electrode groups comprises a plurality of stripes arranged in repeating sets with each set comprised of one display electrode from each of the three separate display electrofe groups.

10. A method according to claim 9; wherein the stripes have a width on the order of 50 $\mu$m.

11. A multicolor display device comprising: first and second substrates disposed in spaced-apart opposed relation; a pattern of separate groups of display electrodes formed on the surface of the first substrate which faces the second substrate; an oxidized aluminum film electrolytically oxidized on each display electrode, the oxidized aluminum films on each separate group of display electrodes being dyed in a color tone which is different from the color tones of the other display electrode groups; a counter electrode pattern formed on the surface of the second substrate which faces the first substrate; and a display material disposed in the space between the spaced apart first and second substrates.

12. A multicolor display device according to claim 11; wherein the pattern of separate groups of display electrodes comprises three separate display electrode groups each having oxidized aluminum films dyed in a different one of the three primary colors.

13. A multicolor display device according to claim 12; wherein the pattern of three separate display electrode groups comprises a plurality of stripes arranged in repeating sets with each set comprised of one display electrode from each of the three separate display electrode groups.

14. A multicolor display device according to claim 13; wherein the stripes have a width on the order of 50 $\mu$m.

* * * * *